March 27, 1934. D. F. SPROUL 1,952,102
CUSHIONING DEVICE
Filed Sept. 28, 1932
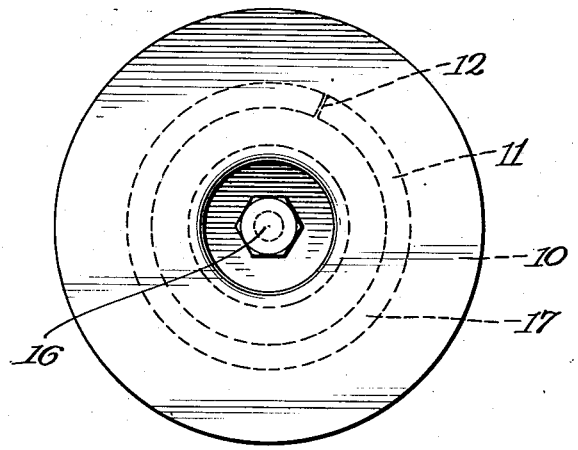
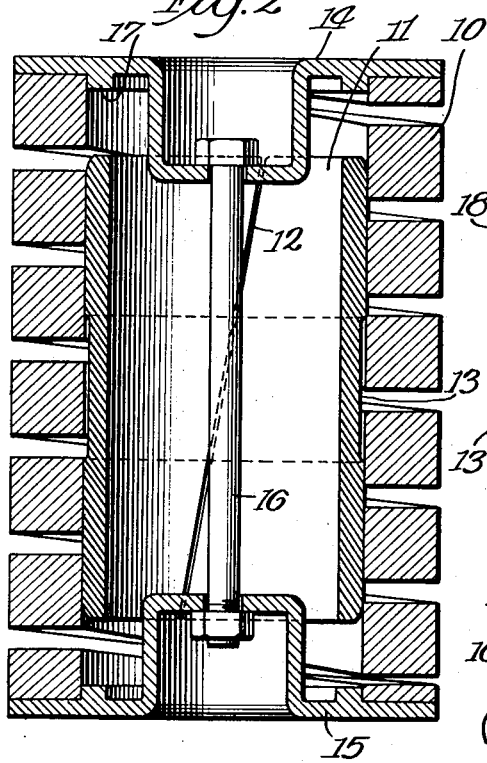
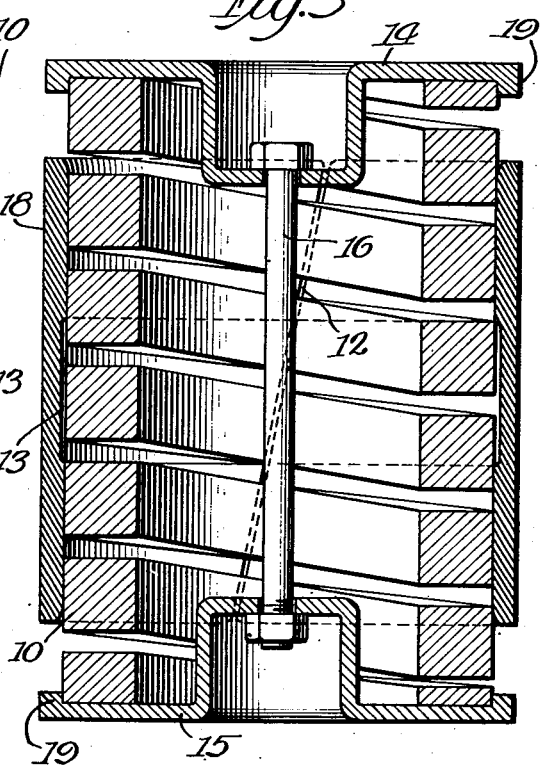
Inventor:
Donald F. Sproul
By Gilson, ... Attys Patented Mar. 27, 1934

1,952,102

UNITED STATES PATENT OFFICE 1,952,102

CUSHIONING DEVICE

Donald F. Sproul, Chicago, Ill., assignor to Cardwell Westinghouse Company, a corporation of Delaware Application September 28, 1932, Serial No. 635,157

5 Claims. (Cl. 267—9)

The invention relates to cushioning devices, and is especially adapted for use as a support for car bolsters and is illustrated in such form.

The object of the invention is to secure, in the type of cushioning devices illustrated, smoothness of action, particularly on release, and to provide for a more uniform distribution of the load through the several turns of the spring.

In the accompanying drawing:

Fig. 1 is an end view of the device;

Fig. 2 is a longitudinal central section of the device as illustrated in Fig. 1; and Fig. 3 is a view similar to Fig. 2, showing a modified form of construction.

The device comprises a helical spring 10, preferably formed of a square rod and thus providing a cylindrical bore having a plane friction face, interrupted by the spacing of the several turns of the spring; and an elastically expansible liner or friction shoe 11, in the form of a cylinder, longitudinally split, as indicated at 12. The cylinder fits within the bore of the spring and frictionally engages the walls thereof by its inherent elasticity, the normal diameter of the cylinder being greater than the bore of the spring.

Intermediate of the ends of the cylinder 11 its friction face is interrupted, as indicated at 13, the external diameter of the cylinder being slightly reduced by the depression of its face. The width of this depressed portion may be varied. As shown, it is approximately twice the width of the inner face of a turn of the spring, and is normally partially overlapped by two of these turns. The lengths of the cylinder 11 is such that it serves as a limiting stop to prevent overcompression of the spring.

A pair of follower plates 14, 15, may be applied to the ends of the spring 10, and are secured together by means of a bolt 16. The central portions of the follower plates are offset inwardly to permit the use of a bolt sufficiently short to be within the length of the device when fully compressed. Each of the follower plates is provided with an instanding annular centering flange 17, for fitting within the spring bore, and serving also as contacts for the ends of the cylinder 11 upon full compression.

These follower plates and the bolt 16 serve to bind the device together for shipment. They may be dispensed with, however, as the liner 11 will retain its place within the spring because of its elasticity. In service the bolster and bottom arch of the truck frame, between which the device is positioned, serve as followers. However, the flanges 17 provide substantial limiting stops and relieve the bolster and truck frame of this duty, and consequently of mutilation.

The frictional resistance being proportional to the relative movement of the engaging parts, is greatest toward the ends of the spring, and in consequence the wear of the face of the shoe is greater adjacent those portions. The middle portion of the shoe being of reduced diameter, and consequently not subjected to wear, the shoe is free to expand to take up the wear on its end portions, and the effective life of the device is thus prolonged. The release after compression is prompt because the turns of the spring facing the reduced portion of the shoe are not subjected to frictional resistance and hence are effective at their full elastic value to urge the end portions of the spring to normal positions, notwithstanding the frictional resistance to which they are subjected.

There is at all times a section of the spring, opposite the depressed face 13 of the cylinder, which is not frictionally engaged, and consequently is free to exert its full expansive strength in effecting the release, and assists the frictionally engaged coils to return to normal position, but without shock.

In the modification of Fig. 3, the split cylinder or friction shoe 18 is sleeved upon the spring 10, and is contracted by its inherent elasticity to frictionally engage the spring. In other respects the device is the same as that of Fig. 2, except that the centering and limiting flanges 19 are located at the outer margins of the followers.

I claim as my invention—

1. In a cushioning device, in combination, a helical spring having a cylindrical friction face, a split metallic cylinder frictionally engaging such face by reason of its inherent elasticity, the friction surface of such cylinder being interrupted intermediate of its ends.

2. In a cushioning device, in combination, a helical spring having a cylindrical friction face, a split metallic cylinder enclosing the spring and frictionally engaging such face by reason of its inherent elasticity, the friction surface of such cylinder being interrupted intermediate of its ends.

3. In a cushioning device, in combination, a helical spring having an inner cylindrical friction face, a split expansible metallic cylinder frictionally engaging such face by reason of its inherent elasticity, the friction surface of such cylinder being interrupted intermediate of its ends.

4. In a cushioning device, in combination, a helical spring, a pair of longitudinally spaced expansible liners frictionally engaging the inner surface of the spring, such liners being secured together and their overall length being less than the normal length of the spring.

5. In a cushioning device, in combination, a helical spring having a cylindrical friction face, a split metallic cylinder frictionally engaging such face by reason of its inherent elasticity, a circumferential zone of the cylinder intermediate of its ends being of reduced diameter.

DONALD F. SPROUL.